JOHN T. H. BROWN.
Improvement in Elevator Hay-Forks.

No. 113,975.

Patented April 25, 1871.

Witnesses:

Inventor:
J. T. H. Brown.

UNITED STATES PATENT OFFICE.

JOHN T. H. BROWN, OF GREENUP, ILLINOIS, ASSIGNOR TO HIMSELF AND J. P. EWART.

IMPROVEMENT IN ELEVATOR HAY-FORKS.

Specification forming part of Letters Patent No. 113,975, dated April 25, 1871.

*To all whom it may concern:*

Be it known that I, JOHN T. H. BROWN, of Greenup, in the county of Cumberland and State of Illinois, have invented a new and useful Improvement in Elevator Hay-Forks; and I do hereby declare that the following is a full, clear, and exact description of the same, reference being had to the accompanying drawing, forming a part of this specification.

My invention relates to forks which are employed, with elevating mechanism, to lift hay, straw, or other long feed into the wagon or the barn; and consists in a peculiar combination of parts, as hereinafter described and claimed.

Figure 1:
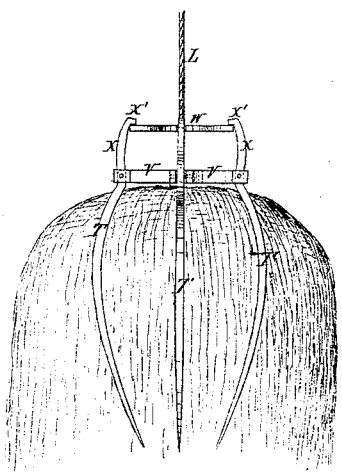
Figure 2:
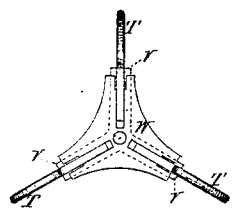

Figure 1 is a side view of my improved fork. Fig. 2 is a top view of the fork.

T T T are the tines, bent inward at $x$, and pivoted to the block V. W is a lock-plate, recessed on the edge at three points to fit about the shanks $x'$ and clasp the tines upon the hay. L represents a rope, which passes through and is fastened under the tine-stock V, and which passes also through the lock-plate W. The weight of the fork will be sufficient to unwind the rope.

The operator then slips upwardly the lock on the rope, spreads the tines, applies them to the hay, and locks them therein by moving the plate W between the shanks $x'$. It is then drawn up in the usual manner, when the lock-plate is slipped upwardly again on the rope and the load is dropped.

Having thus described all that is necessary to a full understanding of my invention, what I esteem to be new, and desire to secure by Letters Patent, is—

The pivoted tines T T T, stock V, and lock-plate W, combined, as described, with the elevator-rope, for the purpose specified.

JOHN T. H. BROWN.

Witnesses:
J. H. MORGAN,
W. J. SWOPE.